W. WALLENTHIN.
JOINT FOR BRACELETS.
APPLICATION FILED OCT. 10, 1907.
900,624.
Patented Oct. 6, 1908.
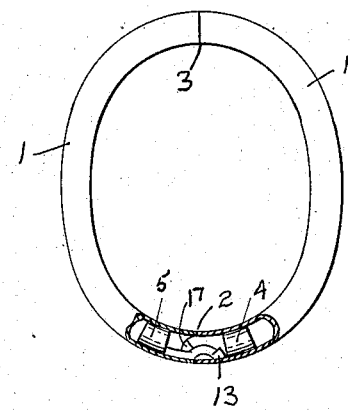
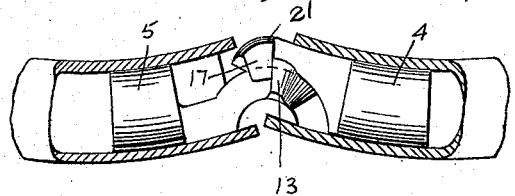
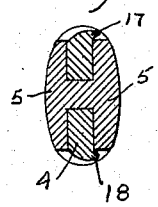
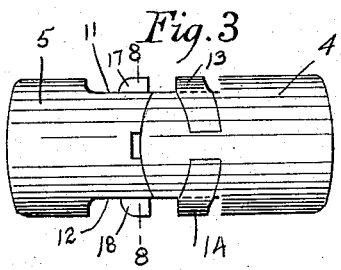
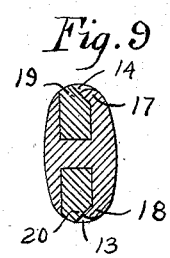
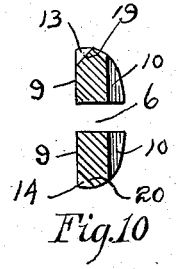
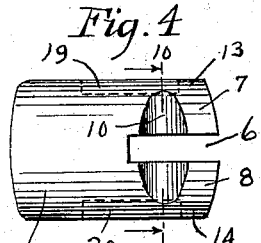
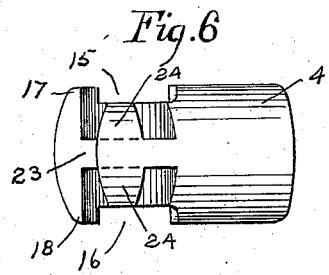
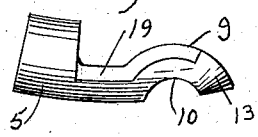
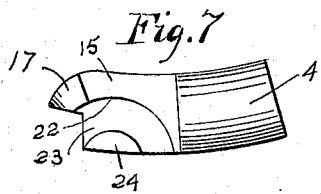
Witnesses
John F. Cavanagh
E. D. Ogden
Inventor
Walfrid Wallenthin
By
Howard E. Barlow
Attorney

UNITED STATES PATENT OFFICE.

WALFRID WALLENTHIN, OF ATTLEBORO, MASSACHUSETTS, ASSIGNOR TO S. O. BIGNEY AND COMPANY, OF ATTLEBORO, MASSACHUSETTS.

JOINT FOR BRACELETS.

No. 900,624.      Specification of Letters Patent.      Patented Oct. 6, 1908.

Application filed October 10, 1907. Serial No. 396,805.

*To all whom it may concern:*

Be it known that I, WALFRID WALLENTHIN, a citizen of the United States, residing at the town of Attleboro, in the county of Bristol and State of Massachusetts, have invented certain new and useful Improvements in Joints for Bracelets, of which the following is a specification, reference being had therein to the accompanying drawing.

This invention relates to joints for bracelets and has for its object to provide a strong and durable joint of simple and practical construction.

A further object of the invention is to provide said joint with interlocking members, and to also provide said members with a simple, strong and durable means for permanently locking the same together, whereby they may be both opened and closed without the possibility of detaching them one from the other. In carrying out my invention either one or both of these interlocking members are provided with one or more overhanging lugs which are adapted to be bent down to engage a corresponding recess in the opposite member, each of which lugs when so bent will bring up against a corresponding lug or extension on the opposite member to prevent the same from being drawn apart and separated. The joints used in bracelets of this character are usually provided with a slender stop pin which is easily sheared off when the bracelet is opened, thereby completely destroying the usefulness of the bracelet. With my improved stop this is impossible, the same being made particularly rugged and strong and well adapted to withstand the comparatively heavy strains required of it.

The invention is fully set forth in this specification and more particularly pointed out in the appended claims.

In the accompanying drawings: Figure 1—shows a complete bracelet in its closed position with a portion of the tubing around the joint broken away, showing the joint members. Fig. 2—is an enlarged sectional side elevation of the joint members inserted in the adjacent ends of the tubular arms, said joint being in its open position. Fig. 3—is a view of the outer side of the joint showing the members in the closed position and the stop lug projecting over each edge of the same. Fig. 4—is a view of the outer side of the fork member disengaged from the web member, showing its recessed portions on either edge, dotted in. Fig. 5—is a side elevation of said member showing the beveled edge. Fig. 6—is a view of the outer side of the web member detached. Fig. 7—is a side elevation of the same. Fig. 8—is a section on line 8—8 of Fig. 3 through one set of locking lugs showing the same bent over against the square edges of the opposite member. Fig. 9—is also a section through the locking lugs but showing the fork member as being beveled or undercut on its edges to receive the bent up stop lugs on the opposite member. Fig. 10—is a sectional view of the fork member on line 10—10 of Fig. 4, looking in the direction of the arrows.

Referring to the drawings, at 1—1 are the two side arms of the bracelet which are preferably constructed of tubing bent into a form to fit the wrist or arm of the wearer.

In bracelets of the character illustrated it is customary to divide the same into two parts or arms hinged together so they may be separated or opened to allow the wrist of the wearer to pass therethrough, after which the arms may be closed together and locked in any convenient way. The point of separation at 2 is where the bracelet joint is formed, while diametrically opposite at 3 is the opening point where the two parts are brought together and secured by any suitable locking device.

My improved bracelet joint is constructed of two interlocking members which may be formed integral with the adjacent ends of the bracelet arms, if desired, or they may be constructed separate and independent of said arms and subsequently secured in the tubing. At 4 is shown one of the interlocking members namely the web member, that is preferably constructed of solid wire bent to conform with the shape of the tubing and adapted to fit and be fixed into one end of one of the arms. The opposite member 5 may also be constructed of solid material, if desired, and is also bent to take the contour or form of the tubing and is adapted to be fixed into the adjacent end of the opposite arm.

The member 5 is provided at one end with a slotted portion 6 formed lengthwise in it from its outer or projecting end leaving the same forked or provided with two extending tines or fingers 7 and 8. These fingers are provided with upper bearing surfaces 9, see Fig. 5, formed in the direction of their length on the arc of a circle and the inner face of each circle is cut out at 10—10 in a circular form concentric with the circular face 9.

Fig. 3—shows each of the edges of the fork member 5 as being cut out for a portion of its length at 11 and 12 leaving outwardly projecting bosses or members 13 and 14 which are adapted to be turned downward into the corresponding slots 15 and 16 in the opposite or web member 4. The end of this web member 4 may also be provided with bosses or outwardly projecting members 17 and 18 which may also be turned down into the slots 11 and 12 in the fork member 5, thereby forming a strong and substantially double lock, the members of which cannot be easily bent and destroyed. When a bracelet is made of narrow stock the members are made correspondingly narrow and in order to obtain the notched portions without cutting away too much of the stock I have found it advantageous in practice to simply bevel off the underside of the fork member for a portion of its length as at 19 and 20 (see Figs. 4, 5, 9 and 10), leaving the ends 13 and 14 square to form abutments or stops. The web member may then be constructed as illustrated in Fig. 6, the ends 17 and 18 being bent up to engage the beveled sides in the manner illustrated in Fig. 9, or the beveled portions may be made on the web member and the projecting ends 13 and 14 of the fork member caused to engage said beveled portions. In this way a very neat and strong joint is obtained even from the narrow stock.

The web member 4 is provided with a forwardly extending overhanging bearing plate 21, which plate is formed integral with said member. The upper surface of its outer end is rounded off on the swinging radius of the joint so as to work into and just clear the tubing as the bracelet is opened and closed, as best illustrated in Fig. 2. The underside of this bearing plate at 22—22 is also formed on the arc of a circle so as to correspond with and slide on the circular faces 9—9 of the fork fingers 7 and 8 of the slotted member 5. Extending downwardly from the central portion of this bearing plate is a narrow guiding web 23 having projecting flanges 24—24 on its lower edge, the upper faces of which flanges are also formed on the arc of a circle concentric with the underbearing surface 22 of the plate and adapted to engage and register with the circular surfaces of the recesses 10—10 formed in the inner walls of the above mentioned fingers.

My improved joint is very simple and inexpensive in construction and exceedingly strong and durable, and by the use of its double stop lugs the possibility of accidentally breaking the members apart is effectually removed.

Having thus described my invention, what I claim as new and desire to secure by Letters Patent, is:

1. In a bracelet, a joint formed of two interlocking members slidably mounted one upon the other, the edges of one or both of said members being provided with recesses, projections on the opposite member adapted to enter said recesses whereby a stop is formed to prevent the members of the joint from being disengaged.

2. In a bracelet, a joint formed of two members slidably mounted one upon the other, the edge of one of said members being provided with a recessed portion, a projecting boss on the edge of the opposite member adapted to be bent over into said recessed portion to form a stop and prevent the members of the joint from becoming disengaged.

3. In a bracelet, a joint formed of two members slidably mounted one upon the other, the edge of one or both of said members being beveled off for a portion of its length leaving a projecting abutting portion near its end, a projecting boss or member on the edge of the opposite member adapted to be bent over into said beveled portion to form a stop and prevent the members of the joint from becoming disengaged.

4. In a bracelet, a joint formed of two members slidably mounted one upon the other, both edges of one or both of said members being provided with a recessed portion, a projecting boss on each edge of one or both of the opposite members adapted to be bent over into said recessed portions to form a double stop and prevent the members of the joint from becoming disengaged.

5. In a bracelet, a joint formed of two members slidably mounted one upon the other, both edges of one of said members being beveled off on its inner side for a portion of its length leaving a projecting abutting portion at each edge near its end, a projecting boss or member on each edge of the opposite member adapted to be bent over into said beveled portion adapted to bring up against said abutting portion to form a double stop and prevent the members of the joint from becoming disengaged.

In testimony whereof I affix my signature in presence of two witnesses.

WALFRID WALLENTHIN.

Witnesses:
   HOWARD E. BARLOW,
   E. I. OGDEN.